United States Patent
Lee et al.

(10) Patent No.: US 8,117,536 B2
(45) Date of Patent: Feb. 14, 2012

(54) SYSTEM AND METHOD FOR CONTROLLING DOWNLOADING WEB PAGES

(75) Inventors: Chung-I Lee, Taipei Hsien (TW); Chien-Fa Yeh, Taipei Hsien (TW); Da-Peng Li, Shenzhen (CN); Zhi-Hong Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 849 days.

(21) Appl. No.: 12/188,207

(22) Filed: Aug. 8, 2008

(65) Prior Publication Data

US 2009/0044102 A1    Feb. 12, 2009

(30) Foreign Application Priority Data

Aug. 9, 2007   (CN) .......................... 2007 1 0201323

(51) Int. Cl.
*G06F 3/00* (2006.01)
*G06F 17/00* (2006.01)
(52) U.S. Cl. ...................................... 715/234; 715/738
(58) Field of Classification Search .................. 715/234, 715/738; 707/708–710, 716, 726–730, 748–751
See application file for complete search history.

(56) References Cited

U.S. PATENT DOCUMENTS

| | | | | |
|---|---|---|---|---|
| 7,379,977 | B2 * | 5/2008 | Walrath | 709/219 |
| 7,421,645 | B2 * | 9/2008 | Reynar | 715/206 |
| 7,428,705 | B2 * | 9/2008 | Ronald et al. | 715/738 |
| 7,584,194 | B2 * | 9/2009 | Tuttle et al. | 1/1 |
| 7,610,546 | B1 * | 10/2009 | Nagao et al. | 715/203 |
| 7,627,817 | B2 * | 12/2009 | Travieso et al. | 715/264 |
| 7,712,020 | B2 * | 5/2010 | Khan | 715/205 |
| 7,873,900 | B2 * | 1/2011 | Khan | 715/234 |
| RE42,413 | E * | 5/2011 | Snyder | 707/802 |
| 7,941,745 | B2 * | 5/2011 | Marukawa | 715/234 |
| 2010/0039664 | A1 * | 2/2010 | Funakawa | 358/1.15 |

FOREIGN PATENT DOCUMENTS

CN    1488109 A    4/2004

OTHER PUBLICATIONS

Zhou Hua, the Journal "Parallel system model of Web information retrieval," Published on Jan. 31, 2007, in Journal of Computer Applications of China.
Yang Tian-Qi, the Journal "Parallel system model of Web information retrieval," Published on Jan. 31, 2007, in Journal of Computer Applications of China.

* cited by examiner

*Primary Examiner* — Weilun Lo
*Assistant Examiner* — Shashi Becker
(74) *Attorney, Agent, or Firm* — Altis Law Group, Inc.

(57) ABSTRACT

A system for controlling downloading web pages is disclosed. The system parses a current web page to generate information about the web pages pointed to by the selected links in the current web page. A number of the selected links and the number of script commands is counted and information about each of the web pages pointed to by the selected links is obtained. Script commands are used for downloading the web pages pointed to by the selected links. The system also switching to a next page of the current web page if the current web page comprises two or more pages, and if the number of the script commands equals the number of the selected links.

6 Claims, 3 Drawing Sheets

SYSTEM AND METHOD FOR CONTROLLING DOWNLOADING WEB PAGES

BACKGROUND OF THE INVENTION

1. Field of the Invention

Embodiments of the present disclosure relate to controlling downloading web pages, and more particularly to a system and method for controlling downloading web pages.

2. Description of Related Art

Commonly, information may be made available in a computer network such as the Internet or intranets in the form of web pages. It is usual for users to use a search engine to find particular pages according to user defined parameters in the form of a search phrase. One example is when a user enters a search phrase and activates a search using a search engine on a web portal to display a list of search results. These search result pages are usually organized in a predictable way. Main search results may be listed in the form of links along with a brief description and/or excerpt of the page pointed to by each link. Additionally there may be many other links on the page that point to other services of the portal or websites of paid advertisers etc. At times a user may wish to download many of the pages to a local server, or a PC for browsing offline. To check each page pointed to by the links and decide if it is desirable to download it is time-consuming and inconvenient. So a user may decide to use a program which can download all the pages pointed to by all the links on the search results page and store them in their computer or server for offline viewing.

However, such programs do not differentiate between the links for the main search results and the other links. Additionally, the search results may be too numerous to list on one page so there may be many search result pages for one search. Unfortunately, many of the links may in fact point to the same page resulting in duplicate downloads and many of the links may point to old pages that are not relevant to the current search when someone is looking for fresh information.

Therefore, what is needed is a system and method for downloading only those web pages pointed to by links on a particular webpage according to user defined parameters.

SUMMARY

A system for controlling downloading web pages is disclosed. The system includes a setting module, a parsing module, a counting module, an obtaining module, a determining module, a generating module, a downloading module, and a next page module. The setting module is configured for controlling downloading of the web pages, the parameters comprising a current web page, selected links of the current web page to examine, and a date posted range of the web pages pointed to by the selected links. The parsing module configured is for parsing the current web page to generate information about the web pages pointed to by the selected links. The obtaining module is configured for obtaining information about each of web pages pointed to by the selected links, wherein the information of each of the web pages pointed to by selected links comprises a posted date. The determining module is configured for determining if the web pages pointed to by the selected links have been downloaded previously, and if the posted date of web pages pointed to by the selected links is within the date posted range. The generating module is configured for generating script commands for downloading the web pages pointed to by the selected links, if the web pages pointed to by the selected links have not been downloaded and the posted date of the web page pointed to by the selected link is within the date posted range. The counting module is configured for counting the number of the selected links by the setting module and the number of script commands generated by the generating module. The downloading module is configured for downloading the web pages pointed to by the selected links in the database by use of the script commands along with the information of each of the web pages pointed to by the selected links. The next page module is configured for switching to a next page if the current web page comprises two or more pages, and if the number of the script commands equals the number of the selected links.

Other systems, methods, features, and advantages of the present invention will be or become apparent to one with skill in the art upon examination of the following drawings and detailed description.

DETAILED DESCRIPTION OF CERTAIN INVENTIVE EMBODIMENTS

Figure 1:
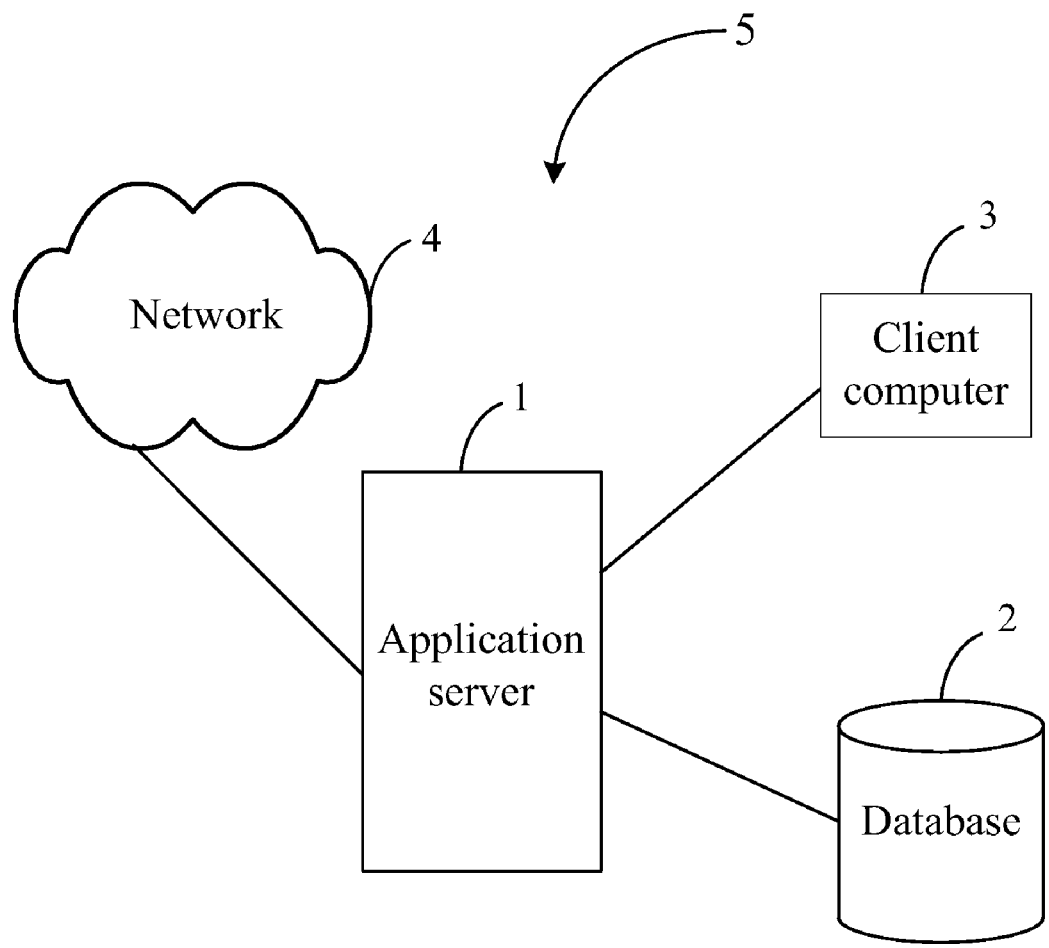
FIG. 1 is a block diagram of hardware configuration of a system for controlling downloading web pages in accordance with one embodiment of the present disclosure.

All of the processes described below may be embodied in, and fully automated via, software code modules executed by one or more general purpose computers or processors. The code modules may be stored in any type of computer-readable medium or other computer storage device. Some or all of the methods may alternatively be embodied in specialized computer hardware FIG. 1 is a block diagram of hardware configuration of a system 5 for controlling downloading web pages in accordance with one embodiment of the present disclosure. In this embodiment, the system includes an application server 1 and a database 2. The application server 1 can access one or more websites via a network 4, and can download web pages. Depending on the embodiment, these web pages may comprise extensible markup language (XML) documents, hypertext markup language (HTML), cascading style-sheets, and/or images, audio, text, and video, or some combination thereof. The application server 1 may be a personal computer (PC), a network server, or any other appropriate data-processing equipment. The network 4 can be a wide area network (i.e., the Internet) or a local area network.

The application server 1 may also connect to a database 2. The database 2 is configured for storing the downloaded web pages. One or more client computers 3 (only one shown) connect to the application server 1, and each is used for providing an operation interface in order to control one or more operations of the application server 1.

Figure 2:
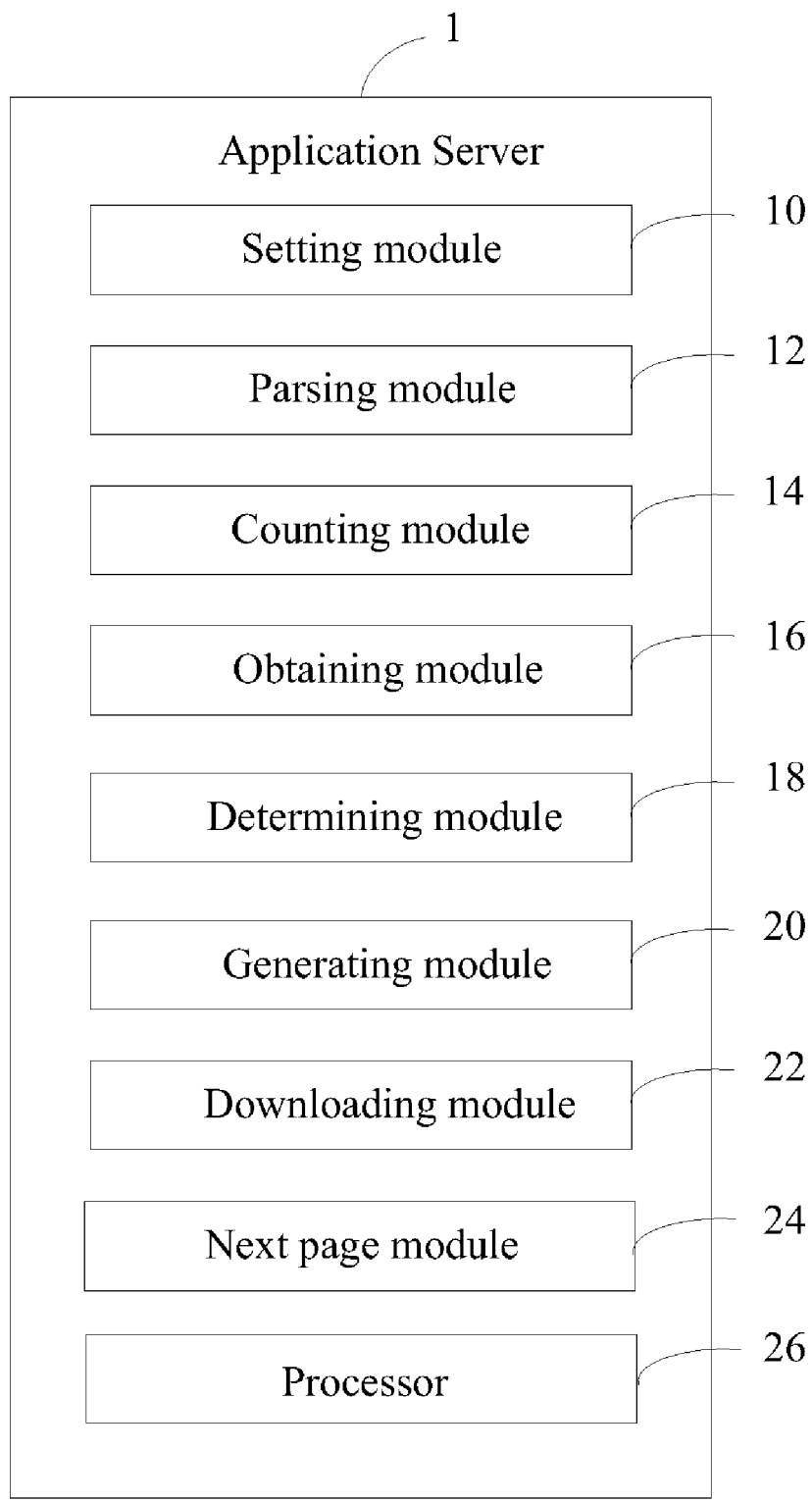
FIG. 2 is a block diagram of one embodiment of function modules of an application server of FIG. 1.

FIG. 2 is a block diagram showing function modules of the application server 1 of FIG. 1. The application server 1 includes a setting module 10, a parsing module 12, a counting module 14, a determining module 18, an obtaining module 16, a generating module 20, a downloading module 22, a next page module 24, and a processor 26.

The setting module 10 is configured for to set parameters for controlling downloading of the web pages, such as a search results page. The parameters include a current web page, selected links of the current web page to examine, a date posted range of the web pages pointed to by the links and a storing path for storing the downloaded web pages in the database 2.

The parsing module 12 is configured for parsing the current web page to generate information about the web pages pointed to by the selected links. The information of the web pages pointed to by the selected links may include a posted date, a URL (Uniform Resource Locator) address and a title.

The counting module 14 is configured for counting the number of the selected links.

The obtaining module 16 is configured for obtaining information of each of the web page pointed to by the selected links. The information of the web pages pointed to by the selected links may include a posted date, a URL (Uniform Resource Locator) address and a title.

The determining module 18 is configured for determining if the web pages pointed to by the selected links have been downloaded previously, if the posted date of web pages pointed to by the selected links is within the date posted range, and if all of the selected links has been detected. In one exemplary embodiment, the application server 1 searches in the database 2 to find if the URL addresses and titles of the selected links exist in the database 2. In one embodiment, a corresponding web page has been downloaded previously if any of the URL addresses and titles of the selected links exist in the database 2.

The generating module 20 is configured for generating script commands for downloading the web pages pointed to by the selected links, if the web pages pointed to by the selected links have not been downloaded and the posted date of the web page pointed to by the selected link is within the date posted range. Script commands are used for downloading the web pages pointed to by the selected links. In one embodiment, a script command can only download the web page pointed to by a link.

The downloading module 22 is configured for downloading the web pages pointed to by the selected links in the database 2 by use of the script commands along with the information of each of the web pages pointed to by the selected links.

The counting module 14 is further configured for counting the number of script (i.e., XQuery script) commands generated by the generating module 20.

The next page module 24 is configured for switching to a next page if the current page comprises two or more pages, and if the number of the script commands equals the number of the selected links.

It may be understood that one or more specialized or general purpose processors, such as a processor 26, in the application server 1 may be used to execute computerized code in the setting module 10, the parsing module 12, the counting module 14, the determining module 18, the obtaining module 16, the generating module 20, the downloading module 22, and the next page module 24.

Figure 3:
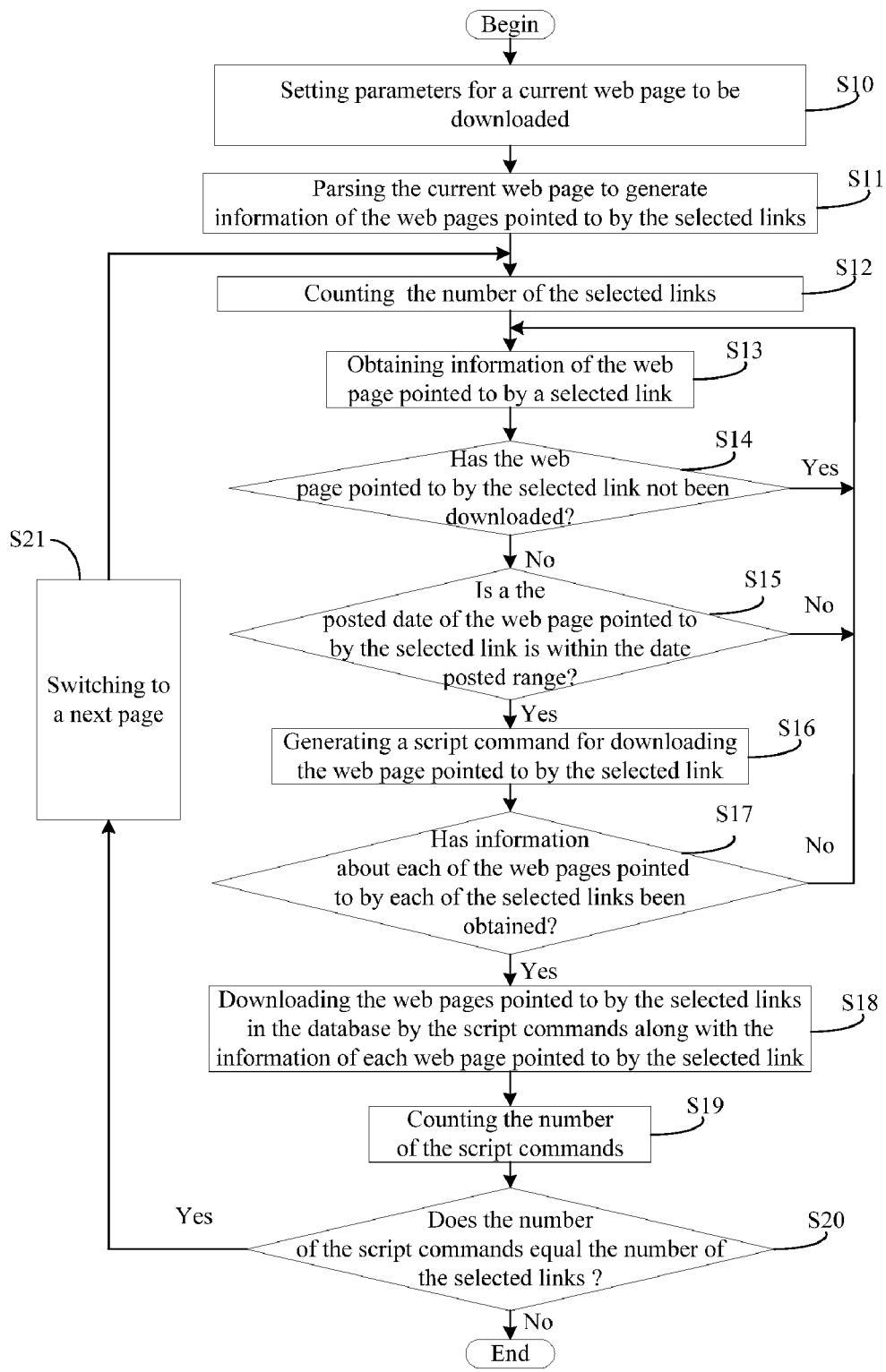
FIG. 3 is a flowchart of one embodiment of a method for controlling downloading web pages in accordance with the present disclosure.

FIG. 3 is a flowchart of one embodiment of a method for controlling downloading web pages in accordance with the present disclosure. In block SI 0, the setting module 10 sets parameters for controlling downloading of the web pages, such as a search results page may be set by a user. The parameters include a current web page, selected links of the current web page to examine, a date posted range of the web pages pointed to by the links and a storing path for storing the downloaded web pages in the database 2.

In block S11, the parsing module 12 parses the current web page to generate information about the web pages pointed to by the selected links. As mentioned above, the information of the web pages pointed to by the selected links may include a posted date, a URL (Uniform Resource Locator) and a title.

In block S12, the counting module 14 counts the number of the selected links of the current web page.

In block S13, the obtaining module 16 obtains information about the web page pointed to by a selected link.

In block S14, the determining module 18 determines if the web page pointed to by the selected link has been downloaded previously.

If the web page pointed to by the selected link has been downloaded previously, the procedure returns to block S13. Otherwise, if the web page pointed to by the selected link has not been downloaded previously, in block S15, the determining module 18 determines if the posted date of web page pointed to by the selected link is within the date posted range.

If the posted date of web page pointed to by the selected link is not within the date posted range, the procedure returns to block S13. Otherwise, if the posted date of web page pointed to by the selected link is within the date posted range, in block S16, the generating module 20 generates a script command for downloading the web page pointed to by the selected link. Script commands are used for downloading the web pages pointed to by the selected links. In one embodiment, a script command can only download the web page pointed to by a link.

In block S17, the determining module 18 determines if information about each of the web pages pointed to by each of selected links has been obtained by the obtaining module 16.

If information about each of the web pages pointed to by each of selected links has been obtained, the procedure returns to block S13. Otherwise, if information about each of the web page pointed to by any of selected links has not been obtained, in block S19, the downloading module 22 downloads the web pages pointed to by the selected links in the database 2 by use of the script commands along with the information of each of the web pages pointed to by the selected links.

In block S19, the counting module 14 counts the number of the script (i.e., XQuery script) commands generated by the generation module 20.

In block S20, the determining module 18 determines if the number of the script commands equals the number of the selected links.

If the number of the script commands equals the number of the selected links, in block S21, the next page module 24 switches to a next page, then the procedure returns to block S13.

Otherwise, if the number of the script commands does not equal the number of the selected links, the procedure ends.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for controlling downloading web pages, the system comprising:
   a setting module configured for setting parameters for controlling downloading of the web pages, the parameters comprising a current web page, selected links of the current web page to examine, and a date posted range of the web pages pointed to by the selected links;
   a parsing module configured for parsing the current web page to generate information about the web pages pointed to by the selected links;

an obtaining module configured for obtaining information about each of the web pages pointed to by the selected links, wherein the information of each of the web pages pointed to by the selected links comprises a posted date;

a determining module configured for determining if the web pages pointed to by the selected links have been downloaded previously, and if the posted date of web pages pointed to by the selected links is within the date posted range;

a generating module configured for generating script commands for downloading the web pages pointed to by the selected links upon the condition that the web pages pointed to by the selected links have not been downloaded and the posted date of the web page pointed to by the selected link is within the date posted range;

a counting module configured for counting the number of the selected links by the setting module and the number of script commands generated by the generating module;

a downloading module configured for downloading the web pages pointed to by the selected links in a database using the script commands along with the information of each of the web pages pointed to by the selected links;

a next page module configured for switching to a next page upon the condition that the current web page comprises two or more pages and the number of the script commands equals the number of the selected links; and at least one processor executing the setting module, the parsing module, the counting module, the determining module, the obtaining module, the generating module, the downloading module, and the next page module.

2. The system according to claim 1, wherein the parameters further include a storing path for storing the downloaded web pages in the database.

3. The system according to claim 1, wherein the information of each of the web pages pointed to by each of the selected links further includes an URL address and a title for each of the web pages.

4. A computer-based method for controlling downloading web pages, the method comprising:

(a) setting parameters for controlling downloading of the web pages, the parameters comprising a current web page, selected links of the current web page to examine and a date posted range of the web pages pointed to by the links;

(b) parsing the current web page to generate information about the web pages pointed to by the selected links;

(c) counting the number of the selected links;

(d) obtaining information of the a web page pointed to by a selected link, the information about the web page pointed to by selected link comprising a posted date;

(e) generating a script command for downloading the web page pointed to by the selected link upon the condition that the web page pointed to by the selected link has not been downloaded and the posted date of the web page pointed to by the selected link is within the date posted range;

(f) repeating blocks (d)-(e) until information about each of the web pages pointed to by each of selected links has been obtained;

(g) downloading the web pages pointed to by the selected links in a database by use of the script commands along with the information of each of the web pages pointed to by the selected link;

(h) counting the number of the script commands; and (i) switching to a next page if the current web page comprises two or more pages, and if the number of the script commands equals the number of the selected links.

5. The method according to claim 4, wherein the parameters further include a storing path for storing the downloaded web pages in the database.

6. The method according to claim 4, wherein the information of each of the web pages pointed to by each of the selected links further includes an URL address and a title for each of the web pages.

* * * * *